United States Patent
Ignor et al.

(10) Patent No.: US 8,598,476 B2
(45) Date of Patent: Dec. 3, 2013

(54) APPARATUS, AND ASSOCIATED METHOD, FOR APPLYING A FINISH TO A KEYPAD

(75) Inventors: Matthew Michael Ignor, Stratford (CA); Timothy Herbert Kyowski, Kitchener (CA)

(73) Assignee: BlackBerry Limited (CA)

( * ) Notice: Subject to any disclaimer, the term of this patent is extended or adjusted under 35 U.S.C. 154(b) by 250 days.

(21) Appl. No.: 13/071,978

(22) Filed: Mar. 25, 2011

(65) Prior Publication Data

US 2012/0241298 A1 Sep. 27, 2012

(51) Int. Cl.
*H01H 9/26* (2006.01)
*H01H 13/72* (2006.01)
*H01H 13/76* (2006.01)

(52) U.S. Cl.
USPC .......................................... 200/5 A; 200/308

(58) Field of Classification Search
USPC ....... 200/345, 341, 314, 302.2, 412, 5 A, 5 R, 200/17 R, 18, 329, 511, 512, 513, 520; 400/112, 128, 129, 133, 134, 134.1, 400/134.2, 144.3, 145.1, 578
See application file for complete search history.

(56) References Cited

U.S. PATENT DOCUMENTS

| | | | | |
|---|---|---|---|---|
| 5,684,279 A | * | 11/1997 | Burgett | 200/5 A |
| 5,742,241 A | * | 4/1998 | Crowley et al. | 341/22 |
| 6,879,317 B2 | * | 4/2005 | Quinn et al. | 345/168 |
| 7,214,897 B2 | * | 5/2007 | Chuang | 200/317 |

* cited by examiner

*Primary Examiner* — Renee S Luebke
*Assistant Examiner* — Anthony R. Jimenez
(74) *Attorney, Agent, or Firm* — Wolff & Samson PC

(57) ABSTRACT

A keypad assembly, and an associated method, is constructed in a manner to permit application of a finish, such as a decoration or painting, to any desired portion of the keys of the assembly, including at interstitial portions between adjacent keys. The keypad assembly includes a carrier membrane upon which keys forming a keypad array and key membrane pieces are supported. The carrier membrane is wrapped about a cylindrical fixture to position all portions of the keys in orientations to permit application of the finish thereto.

19 Claims, 3 Drawing Sheets

APPARATUS, AND ASSOCIATED METHOD, FOR APPLYING A FINISH TO A KEYPAD

The present disclosure relates generally to a manner by which to provide a keypad assembly that includes a finish, such as a decoration or painting, applied to interstitial portions of the keys of the keypad assembly. More particularly, the present disclosure relates to a method by which to apply the finish to the keys including the interstitial portions and to provide a keypad assembly to which the finish has been applied.

Keypad assemblies of small dimensions, having keys positioned close to one another, are provided with painting, decoration, or other finish applied at desired locations of the keys.

BACKGROUND

Electronic devices, such as portable communication devices, typically include a user interface that provides a user with the capability to interact with the device. The user interface, for instance, typically includes one or more input actuators, such as a key or a button, that is utilized by a user to provide input commands, instructions, and information utilized during operation of the device.

A wireless device operable in a radio communication system is exemplary of an electronic device that includes a user interface to provide a user with input actuation keys to input information, control instructions, and input commands utilized pursuant to operation of the wireless device.

A wireless device typically includes a telephonic keypad that at least includes input keys associated with each of the ten numeric dialing digits and also a "asterisk" and "number" key. The user interface of a wireless device typically further includes one or more additional keys used for additional purposes. And, some wireless devices include a keypad that includes alphabetical characters, such as keypads that are arranged in QWERTY configuration.

An exemplary radio communication system is a cellular communication system. Cellular communication systems have been deployed throughout the world, and wireless devices, sometimes referred to as mobile stations, are used to communicate in a cellular communication system. Other wireless networks are analogously deployed and are regularly utilized.

Early-generation, cellular communication systems generally provided primarily for voice communication services and only limited data communication services. The keypads of wireless devices constructed for use in such early-generation communication systems generally provided user interfaces consisting of numeric input keys. Newer-generation devices, operable in newer-generation systems, are generally capable of being utilized for data-intensive communication services, such as messaging services and other communication services in which data is communicated by, and with, the wireless device. When the wireless device is capable of use pursuant to a service that utilizes communication of textual data, the wireless device often times includes a QWERTY keypad.

Advancements in technologies have permitted the circuitry of the wireless devices, and also of other electronic devices, to be significantly reduced in physical dimensions, i.e., miniaturized. The physical dimensions of the resultant device, that is, a device that incorporates the circuitry of the reduced dimensions can correspondingly be reduced. The housing in which the circuitry of the device is positioned can be reduced, facilitating hand carriage of the device.

Concomitant with the decrease in the physical dimensions of electronic devices has been a decrease in the physical dimensions of the associated user interfaces for the devices. A user interface, typically supported at the housing of the electronic device is constrained in dimensions by the dimensions of the housing. As the size of the housing decreases, the size of the user interface correspondingly must decrease.

The reduced physical dimensions permitted of the user interface poses various manufacturing challenges to the manufacture and assembly of the user interfaces for such devices of reduced dimensions.

For instance, due to the increased dimensional constraints imposed upon the user interfaces, not only are the sizes of the user interfaces reduced, but, further, the component parts of the user interfaces are also reduced. For example, the sizes of the keys of a keypad that typically forms a user-interface input of an electronic device must be of reduced dimensions. Both numeric, QWERTY, and other alphanumeric keypads, and the respective keys thereof, must generally be of reduced dimensions. And, the keys of the keypads are placed in the closer proximity with one another.

A keypad, of small dimensions, upon which a finish, such as a painting or decoration is applied, and an associated method for applying the finish to the keys of the keypad is therefore needed.

It is in light of this background information related to user interfaces for electronic, and other, devices that the significant improvements of the present disclosure have evolved.

DETAILED DESCRIPTION

Figure 1:
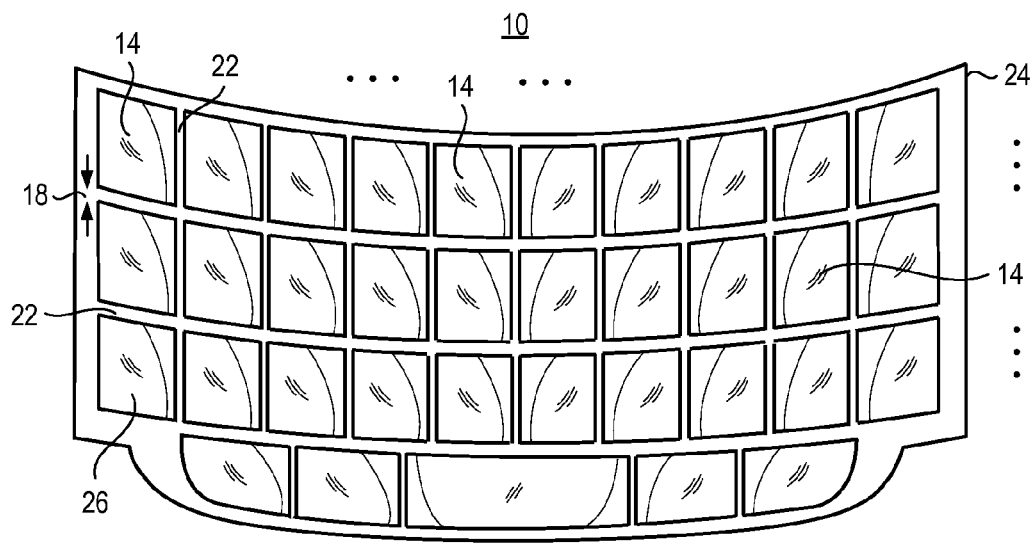
FIG. 1 illustrates a keypad assembly of an implementation of the present disclosure.

The present disclosure, accordingly, advantageously provides an apparatus, and an associated method, for a keypad assembly that includes a finish, such as a decoration or a painting, that is applied, e.g., to interstitial portions of keys of the keypad assembly.

Through operation of an implementation of the present disclosure, a manner is provided by which to provide keys of a keypad with painting, decoration, or other finish at desired portions of the keys, including interstitial portions of the keys. A keypad having a painting, decoration, or other finish applied to interstitial portions of the keys of the keypad is also provided.

In one aspect of the present disclosure, a keypad of small dimensions, having keys positioned close to one another, is able to be decorated or painted in a desired manner including a finish applied to an interstitial portion of a key of a keypad, if desired.

In another aspect of the present disclosure, a keypad is provided that includes a plurality of keys that are arranged in a manner that defines an array of keys, i.e., a keypad array.

The keypad array comprises, for instance, a numeric keypad array or, e.g., a QWERTY keypad array.

In another aspect of the present disclosure, membrane pieces of a membrane are positioned between undersurfaces of the keys of the keypad array positioned, e.g., between adjacent keys of the keypad array.

In another aspect of the present disclosure, a carrier membrane is provided. The carrier membrane is formed of a flexible material, such as a flexible thermoplastic material and is of dimensions to carry the keys that are arranged in the keypad array and also the key membrane pieces thereon. The keys and the key membrane pieces are, e.g., affixed in position upon the carrier membrane or are formed integral therewith.

In another aspect of the present disclosure, the carrier membrane, with the plurality of keys and key membrane pieces carried thereon, is permitting of a bending flex motion to permit flexing of the carrier membrane between a horizontal, substantially planar position, and a convex configuration, i.e., a convex carrier configuration, in which the keys of the keypad array and the key membrane pieces are flexed together with the carrier membrane such that the keys and the key member pieces exhibit increased angular offsets relative to one another.

In another aspect of the present disclosure, a finish, such as painting or a decoration, is applied to selected portions of the keys of the keypad array. The finish is applied to any desired portion of a key of the keypad array that is visible to a user of an electronic device to which the keypad assembly is associated. The desired finish is applied to the keys of the keypad array at the desired portions of the keys of the array, including at interstitial portions of the keys, irrespective of the spacing between the adjacent keys of the key pad array when the carrier membrane, upon which the keypad array is carried, is in a substantially planar, or flat, position.

In another aspect of the present disclosure, the carrier membrane, with the keypad array and key membrane pieces carried thereon is positioned in the convex carrier configuration by wrapping the carrier membrane about a cylindrical fixture. The cylindrical fixture comprises, for instance, a spindle or other convex-surfaced piece capable of supporting or providing for positioning of the carrier membrane thereon. When the carrier membrane is wrapped about the cylindrical fixture, the corresponding flexing imparted to the keys of the keypad array, which causes adjacent keys to be of increased angular offsets relative to each other, places interstitial portions of the keys in position to permit application of a finish thereto. The positioning of the carrier membrane in the convex carrier configuration thereby opens the interstitial portions of the keys to permit even and accurate application of the finish upon the interstitial portions of the keys. Once the finish has been applied to the desired portions of the keys of the keypad array, the carrier membrane, and the keys and key membrane pieces carried thereon, are removed from the cylindrical fixture, and the key pad assembly is assembled to form part of the wireless, or other electronic, device pursuant to an assembly process.

A keypad assembly is therefore provided that is permitted to be of small physical dimensions while also permitting a finish to be applied upon a desired portion of one or more keys of the key pad assembly including at an interstitial portion of a key of the keypad array.

In these and further aspects, a keypad assembly, and an associated method, is provided. A plurality of keys are arranged in a keypad array. A group of key membrane pieces are provided. A key membrane piece of the group is positioned between under surfaces of adjacent keys of the keypad array into which the plurality of keys is arranged. A carrier membrane is configured to carry the plurality of keys and the group of key membrane pieces thereon. The carrier membrane is permitting of a bending flex motion to position the carrier membrane into a convex carrier configuration at which the keys and the key member pieces exhibit increased angular offsets relative to one another.

Turning first to FIG. 1, a keypad assembly 10 constructed pursuant to an implementation of the present disclosure provides for input of information, control commands, and instructions to an electronic device (not shown in FIG. 1). The keypad assembly includes a plurality of keys 14 that are arranged in rows and columns to form an array of keys, i.e., a keypad array. Here, the keys define a QWERTY keypad with alphabetical characters arranged in QWERTY style, of which individual ones of the keys are actuated by a user to enter a character associated with the individual key. In the exemplary implementation, the keys 14 are comprised of a thermoplastic material and are configured in the form of upstanding buttons that extend above a face surface of the keypad assembly. Individual ones of the keys are separated by separation distances 18. In one implementation, the separation distance 18 differs in the horizontal and vertical directions. That is to say, in one implementation, the separation distances between keys adjacent to one another in a vertical direction are different than the separation distances that separate keys adjacent to one another in a horizontal direction. And, in another implementation, separation distances between adjacent keys are row and/or column dependent.

In the exemplary implementation, membrane pieces 22 are positioned to extend between under surface portions (hidden from view in FIG. 1) that support the keys 14 in the arrayed configuration. The membrane pieces 22, in one implementation, are connected together and define a pattern, which, in turn, defines the array by controlling the positioning of the keys 14.

The keypad assembly further includes a carrier membrane 24. The carrier membrane is positioned beneath the key membrane pieces 22 and the keys 14. Edge portions of the carrier membrane are illustrated in the FIG. 1. The edge portions extend beyond the key membrane pieces thereby to permit carriage of the key membrane pieces together with the keys when arranged in the array configuration.

The carrier membrane is comprised of a flexible material that is permitting of a bending flex motion responsive to application of bending forces applied thereto. The key membrane pieces 22 and the keys 14, when carried upon the carrier membrane, as shown, are moved together with movement of the carrier membrane when the bending flex forces are applied to bend the carrier membrane into a convex carrier configuration. When the bending flex forces are applied, the bending of the carrier membrane into the convex carrier configuration causes the keys 14 carried upon the carrier membrane to be reoriented, to be repositioned relative to one another. The keys, and the key member pieces extending between undersurfaces of adjacent ones of the keys are caused to exhibit altered angular offsets relative to one another. And, when the carrier membrane is returned to a non-flexed position, either through termination of application of the bending flex forces or application of bending flex forces in a reverse direction, i.e., to return the carrier membrane to a substantially planar configuration, such as that shown in FIG. 1, the keys and key member pieces are again reoriented relative to one another.

The keypad 10 further includes a finish 26 applied to portions of one or more of the keys 14. The finish comprises, for instance, painting applied to the key or decoration applied to the key. The finish 26 pursuant to an implementation of the present disclosure, is applied at any desired portion of the key that might be visible to a user of the keypad assembly during normal operation. Due to the small separation distances separating adjacent keys 14 of the keypad array, the application of the finish to interstitial portions of the adjacent keys is carried out by first applying the bending flex forces to the carrier member, and the key and key membrane pieces carried thereon to position the carrier membrane in the convex carrier configuration. Once positioned in the convex carrier configuration, the finish is applied, and the carrier membrane is permitted to return to a non-flexed position. The reorientation of the keys responsive to the bending movement of the carrier membrane into the altered angular offsets relative to one another opens areas of the keys or application of the finish that otherwise would not be accessible. Interstitial portions of the keys, for instance, which otherwise would not be accessible to apply the finish thereto are amenable for application of the finish when the carrier membrane is positioned in the convex carrier configuration.

FIG. 2 again illustrates the keypad assembly 10. The view shown in FIG. 2 again illustrates the keys 14, the key membrane pieces 22 positioned between undersurfaces 28 of adjacent ones of the keys, and the carrier membrane 22. The keys 14 are shown to be seated at locations defined by the key membrane pieces 22, and the positioning of the keys 14 define the separation distances 18 that separate the adjacent ones of the keys 14.

The carrier membrane 24 is again shown to carry the keys 14 and key membrane pieces 22 and also to be of dimensions to extend beyond the keypad array formed of the keys 14 positioned at the locations defined by the key membrane pieces 22.

Figure 2:
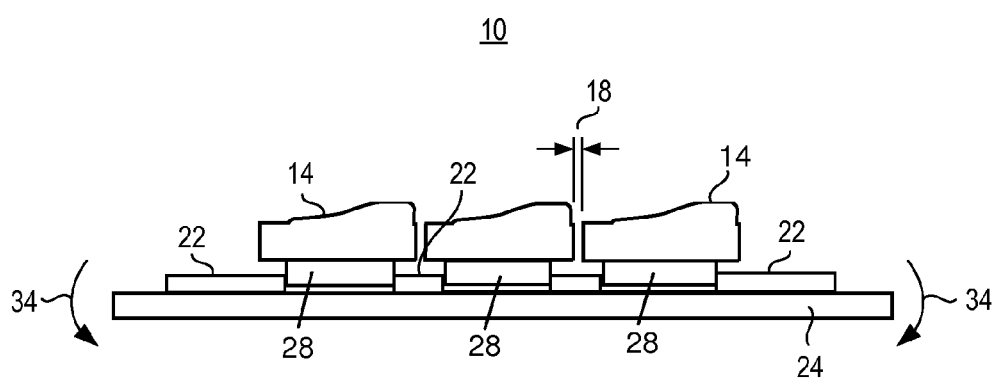
FIG. 2 illustrates a side, elevational view of a portion of the keypad assembly shown in FIG. 1.

The arrows 34 represent bending flex forces that are applied to the carrier membrane to position the carrier membrane in the convex carrier configuration to alter the angular offsets of the keys 14 relative to one another. For example, in the illustration of FIG. 2, the keys 14 are upstanding and parallel to one another. The application of the bending flex forces to the carrier membrane causes flexing motion of the membrane to cause the keys to be reoriented to be offset from one another to make the interstitial portions of the keys amendable for application of a finish thereto. The carrier membrane, once the desired finish is applied to the keys, is returned to the position, as shown in FIG. 2, upon termination of application of the forces 34 or, alternately, by application of forces reverse to those of arrows 34.

Figure 3:
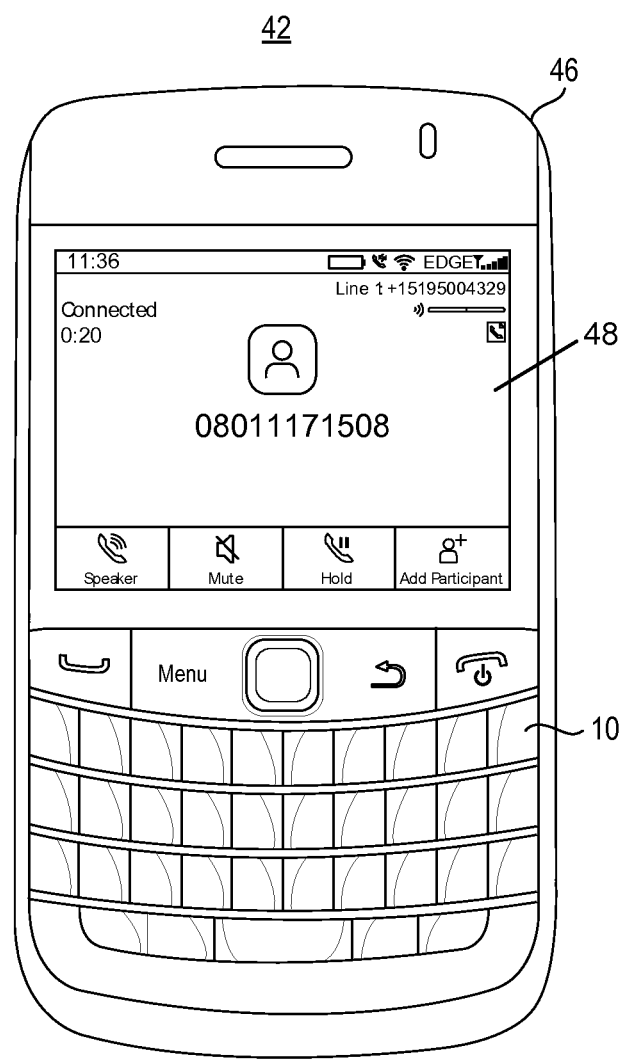
FIG. 3 illustrates a representation of a wireless device that includes the keypad assembly as a portion thereof.

FIG. 3 illustrates a wireless device 42 that includes the keypad assembly 10 as a portion thereof. The keypad assembly 10 includes a finish applied to the keys 14 at any desired portions thereof visible to a viewer or user of the wireless device. The keypad assembly 10 is here supported at a housing 46 of the wireless device, positioned below, as shown, a display element 48. The display element 48 and the keyboard assembly together form the user interface of the wireless device.

In operation, a user of the wireless device enters information, commands, and operational control instructions by way of the keypad assembly 10. The user actuates individual keys 14 of the keypad assembly to enter the information, commands, or instructions. And, circuitry (not shown) housed within the housing 46 causes operation of the wireless device in conformity with the entered instructions or commands or causes communication of the entered information, as appropriate.

Figure 4:
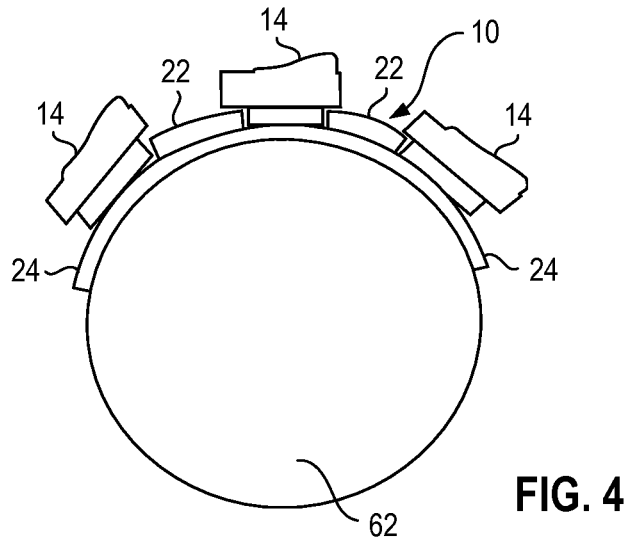
FIG. 4 illustrates a representation of the keypad assembly shown in FIGS. 1-2 in a convex carrier configuration upon a cylindrical fixture.

FIG. 4 again illustrates the keypad assembly 10, again illustrating the keys 14, key membrane pieces 22, and carrier membrane 24. Here, the keypad assembly is positioned at, or supported on, a cylindrical fixture 62. Because the carrier membrane is comprised of a flexible material, the membrane is positionable to be supported or otherwise positioned at the fixture. When positioned at the fixture, the keys and key membrane pieces are reoriented relative to one another to alter the relative angular offsets between the elements and to expose the interstitial portions of the keys and key membrane pieces for application of the finish material thereon.

Once applied, the keypad assembly is removed from the fixture 62, and the keypad assembly is available for assembly as part of an electronic device, such as the wireless device 42 shown in FIG. 3. The positioning of the keypad assembly at a cylindrical fixture, or the like, is readily carried out, such as by an automated process during assembly operations. Because the positioning of the carrier membrane in the convex carrier configuration positions even interstitial portions of the keys of the keypad assembly to permit application of a finish thereto, almost any desired finish, pattern, decoration, or painting is able to be applied to any portion of the keys or key membrane that are noticeable by a viewer positioned above the keypad assembly.

Figure 5:
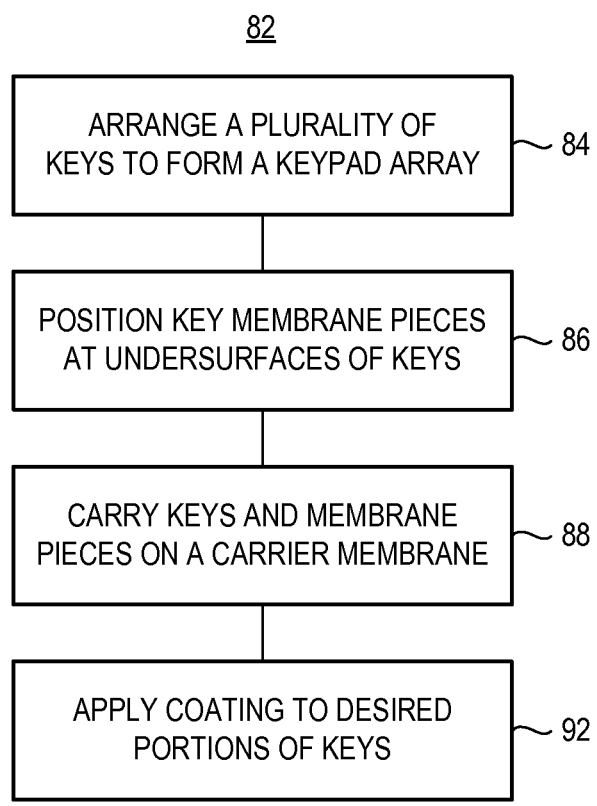
FIG. 5 illustrates a method flow diagram representative of the method of operation of an implementation of the present disclosure.

FIG. 5 illustrates a method 82 of an implementation of the present disclosure. The method facilitates formation of a keypad assembly.

First, and as indicated by the block 84, a plurality of keys are arranged to form a keypad array. Then, and as indicated by the block 86, key membrane pieces are positioned between undersurfaces of adjacent keys of the keypad array.

Then, and as indicated by the block 88, the keypad array and the key membrane pieces are carried on a carrier membrane. The carrier membrane is permitting of a bending flex motion into a convex carrier configuration at which the keypad array and the key membrane pieces, carried on the carrier membrane, exhibit increased angular offsets relative to one another. And, as indicated by the block 92, a coating is applied to a desired portion of one or more keys of the keypad array.

Thereby, a manner is provided by which to apply a finish to any desired portion of a key of a keypad array. The manner is amendable for automated assembly operations in which the keypad assembly is created and a finish is applied thereto.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

What is claimed is:

1. A keypad assembly comprising:
    a plurality of keys arranged in a keypad array;
    a group of key membrane pieces, a key membrane piece of the group positioned between undersurfaces of adjacent keys of the keypad array into which the plurality of keys is arranged;
    a carrier membrane configured to carry the plurality of keys and the group of key membrane pieces thereon, the carrier membrane permitting of a bending flex motion into a convex carrier configuration at which the keys and the key member pieces exhibit altered angular offsets relative to one another; and
    a finish applied to at least one interstitial portion of a key of the plurality of keys while the carrier membrane is bent into the convex carrier configuration.

2. The keypad assembly of claim 1 wherein the finish comprises a decoration applied at the at least one interstitial portion of the key of the plurality of keys.

3. The keypad assembly of claim 1 wherein the finish comprises a painting applied at the at least one interstitial portion of the key of the plurality of keys.

4. The keypad assembly of claim 1 wherein the plurality of keys is arranged in a keypad array that forms an alphanumeric keypad.

5. The keypad assembly of claim 1 wherein the key membrane pieces of the group of key membrane pieces are permitting of the bending flex motion together with the bending flex motion of the carrier membrane.

6. The keypad assembly of claim 1 wherein the key membrane pieces of the group of key membrane pieces and the carrier membrane are integrally formed.

7. The keypad assembly of claim 6 wherein the plurality of keys are further integrally formed with the key membrane pieces of the group of key membrane pieces and the carrier member.

8. The keypad assembly of claim 1 wherein the carrier membrane is comprised of an opaque material.

9. The keypad assembly of claim 1 wherein the bending flex motion comprises motion to position the carrier membrane at the convex carrier configuration at which interstitial portions of the keys are positioned to receive application of the finish.

10. The keypad assembly of claim 1 wherein the convex carrier configuration into which the carrier membrane is positionable comprises a cylindrical-fixture-seatable configuration.

11. A method for facilitating formation of a keypad assembly the method comprising:
arranging a plurality of keys to form a keypad array;
positioning key membrane pieces between undersurfaces of adjacent keys of the keypad array;
carrying the keypad array and key membrane pieces on a carrier membrane, the carrier membrane permitting of a bending flex motion into a convex carrier configuration at which the keypad array and the key membrane pieces, carried on the carrier membrane, exhibit increased angular offsets relative to one another;
bending the carrier membrane in the bending flex motion into the convex carrier configuration; and
applying a finish to at least an interstitial portion of a key of the keypad array while the carrier membrane is in the convex carrier configuration.

12. The method of claim 11 wherein the bending the carrier membrane comprises wrapping the carrier membrane about a cylindrical fixture.

13. The method of claim 12 wherein applying a finish to at least an interstitial portion of a key of the keypad array comprises:
applying a coating to at least an interstitial portion of a key of the keypad array while the carrier membrane is wrapped about the cylindrical fixture.

14. The method of claim 12 wherein applying a finish to at least an interstitial portion of a key of the keypad array comprises:
painting at least an interstitial portion of a key of the keypad array while the carrier membrane is wrapped about the cylindrical fixture.

15. The method of claim wherein applying a finish to at least an interstitial portion of a key of the keypad array comprises:
applying a decoration to at least an interstitial portion of a key of the keypad array while the carrier membrane is wrapped about the cylindrical fixture.

16. The method of claim 11 wherein the bending the carrier membrane in the bending flex motion into the convex carrier configuration positions interstitial portions of the plurality of keys of the keypad array to receive the application of the finish.

17. The method of claim 11 wherein the key membrane pieces positioned during the positioning comprise opaque key member pieces.

18. A method for decorating keys of a keypad, the method comprising:
seating a keypad array having keys and key membrane pieces positioned between undersurfaces of adjacent keys of the keypad array upon a carrier membrane;
bending the carrier membrane about a cylindrical fixture; and
applying a decoration to at least an interstitial portion of a key of the keypad array while the carrier membrane is bent about the cylindrical fixture.

19. The method of claim 11, further comprising:
returning the carrier membrane to a non-flexed position once the finish is applied to at least an interstitial portion of a key of the keypad array; and installing the carrier membrane carrying the key membrane pieces and the keypad array with the finish applied to at least an interstitial portion of a key of the keypad array as a keypad assembly in a wireless device.

* * * * *

UNITED STATES PATENT AND TRADEMARK OFFICE
CERTIFICATE OF CORRECTION

| | | |
|---|---|---|
| PATENT NO. | : 8,598,476 B2 | |
| APPLICATION NO. | : 13/071978 | |
| DATED | : December 3, 2013 | |
| INVENTOR(S) | : Matthew Michael Ignor et al. | |

It is certified that error appears in the above-identified patent and that said Letters Patent is hereby corrected as shown below:

In the Claims:

In Claim 15, column 8, line 13, "The method of claim wherein applying a finish" should read --The method of claim 12 wherein applying a finish--

Signed and Sealed this
Twenty-ninth Day of July, 2014

Michelle K. Lee
*Deputy Director of the United States Patent and Trademark Office*